United States Patent
Ramabadran et al.

(10) Patent No.: US 9,405,877 B1
(45) Date of Patent: Aug. 2, 2016

(54) SYSTEM AND METHOD OF FAST PHASE ALIGNED LOCAL GENERATION OF CLOCKS ON MULTIPLE FPGA SYSTEM

(71) Applicant: Cadence Design Systems, Inc., San Jose, CA (US)

(72) Inventors: Vasant V. Ramabadran, San Jose, CA (US); Chun-Kuen Ho, San Ramon, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/580,014

(22) Filed: Dec. 22, 2014

(51) Int. Cl.
  *G06F 17/50* (2006.01)

(52) U.S. Cl.
  CPC ........ *G06F 17/5054* (2013.01); *G06F 2217/84* (2013.01)

(58) Field of Classification Search
  USPC .......................................................... 716/108
  See application file for complete search history.

(56) References Cited

U.S. PATENT DOCUMENTS

| | | | |
|---|---|---|---|
| 5,109,353 A | 4/1992 | Sample et al. | |
| 5,329,470 A | 7/1994 | Sample et al. | |
| 5,425,036 A | 6/1995 | Liu et al. | |
| 5,448,496 A | 9/1995 | Butts et al. | |
| 5,452,231 A | 9/1995 | Butts et al. | |
| 5,452,239 A | 9/1995 | Dai et al. | |
| 5,475,830 A | 12/1995 | Chen et al. | |
| 5,477,475 A | 12/1995 | Sample et al. | |
| 5,649,167 A | 7/1997 | Chen et al. | |
| 5,661,662 A | 8/1997 | Butts et al. | |
| 5,812,414 A | 9/1998 | Butts et al. | |
| 5,821,773 A | 10/1998 | Norman et al. | |
| 5,841,967 A | 11/1998 | Sample et al. | |
| 5,943,490 A | 8/1999 | Sample | |
| 5,960,191 A | 9/1999 | Sample et al. | |
| 5,963,735 A | 10/1999 | Sample et al. | |
| 6,020,760 A | 2/2000 | Sample et al. | |
| 6,058,492 A | 5/2000 | Sample et al. | |
| 6,377,911 B1 | 4/2002 | Sample et al. | |
| 6,377,912 B1 | 4/2002 | Sample et al. | |
| 6,446,249 B1 | 9/2002 | Wang et al. | |
| 6,625,793 B2 | 9/2003 | Sample et al. | |
| 6,697,957 B1 | 2/2004 | Wang et al. | |
| 6,832,185 B1 | 12/2004 | Musselman et al. | |
| 6,842,729 B2 | 1/2005 | Sample et al. | |
| 6,882,176 B1 | 4/2005 | Norman et al. | |
| 7,260,794 B2 | 8/2007 | Butts | |
| 7,379,861 B2 | 5/2008 | Kfir et al. | |
| 7,739,097 B2 | 6/2010 | Sample et al. | |
| 8,635,579 B1* | 1/2014 | Cao | G06F 17/5045 716/105 |
| 2008/0072025 A1* | 3/2008 | Staszewski | G06F 9/30032 712/241 |
| 2009/0183136 A1* | 7/2009 | Boerstler | H03L 7/0998 716/116 |

(Continued)

*Primary Examiner* — Mohammed Alam
(74) *Attorney, Agent, or Firm* — Kaye Scholer LLP

(57) ABSTRACT

An apparatus and method for fast phase aligned local generation of design clocks on a multiple FPGA system via clock generator replication is described. The apparatus includes a reference clock that generates a clock signal have a reference frequency and a plurality of programmable logic devices. Each programmable logic device includes phase locked loop circuitry that receives the clock signal from the reference clock and generates a local reference clock signal having a frequency based on the reference frequency and a clock generator that receives the local reference clock signal and generates local design clocks based on the local reference clock signal. Because each local design clock generator is synchronized by the same reference clock over a low skew line, the edges of the local design clocks are aligned.

13 Claims, 5 Drawing Sheets

(56) References Cited

U.S. PATENT DOCUMENTS

2011/0264436 A1* 10/2011 Ni ................... G06F 11/3652
                                                    703/28
2014/0132305 A1* 5/2014 Gaide ................... G06F 1/10
                                                    326/93
2015/0288370 A1* 10/2015 Deng ................... H03L 7/0997
                                                    327/158

* cited by examiner

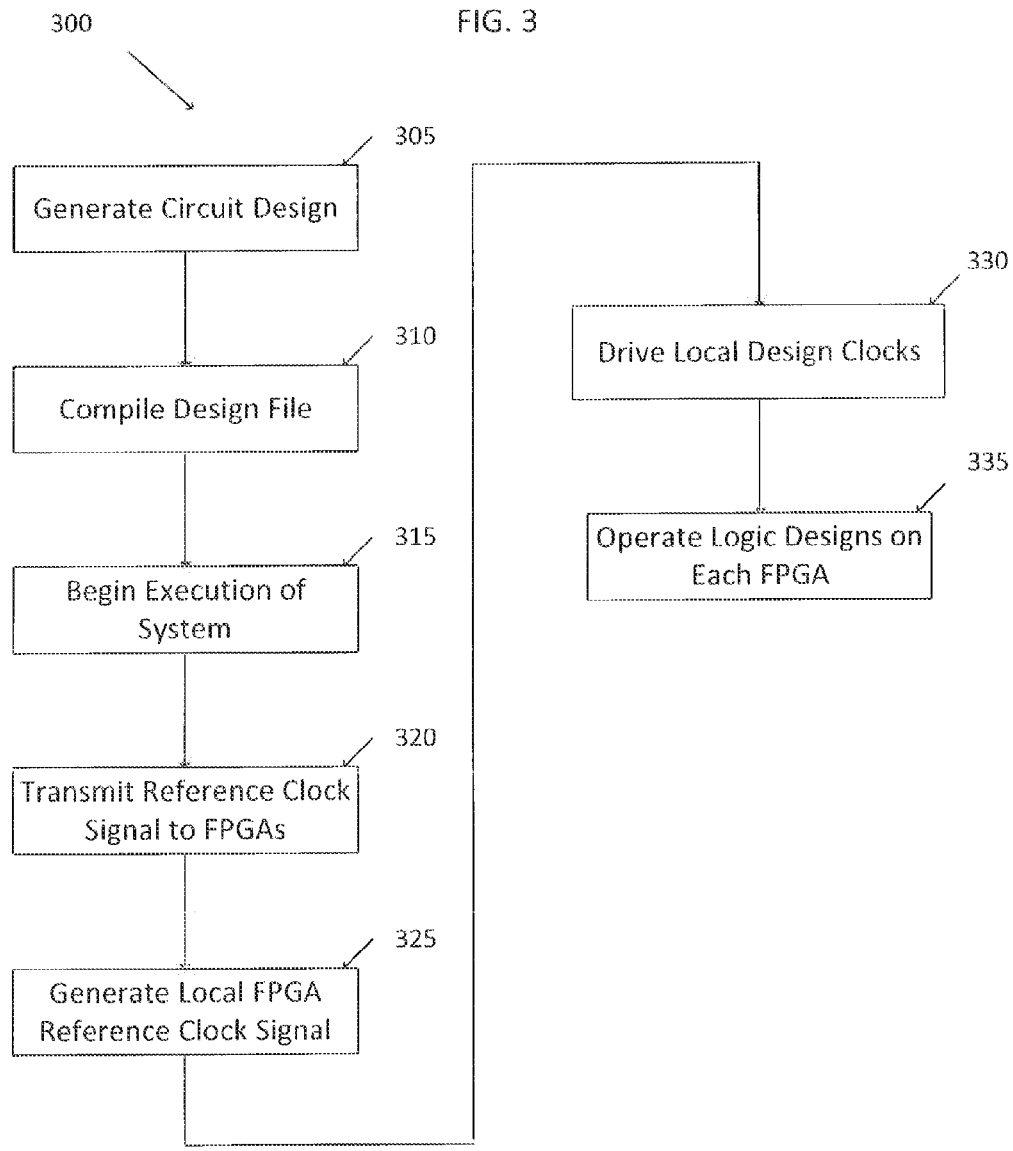

SYSTEM AND METHOD OF FAST PHASE ALIGNED LOCAL GENERATION OF CLOCKS ON MULTIPLE FPGA SYSTEM

FIELD

The present patent document relates generally to functional verification systems for circuit designs. In particular, the present patent document relates to a method and apparatus for fast phase aligned local generation of design clocks on a multiple FPGA system via clock generator replication.

BACKGROUND

Designers of integrated circuit devices ("chips"), generally application-specific integrated circuits ("ASICs"), use prototyping as part of the electronic design automation process prior to manufacture of the chip. Prototyping is one type of hardware-based functional verification that allows the circuit designer to observe the behavior of the circuit design under conditions approximating its final, manufactured performance. During prototyping, a circuit design, generally written in register transfer language ("RTL") code, is programmed into one or more programmable logic chips, frequently field-programmable gate arrays ("FPGA") on a prototyping board. FPGA-based prototypes are a fully functional representation of the circuit design, its circuit board, and its input/output ("I/O") devices. Also, FPGA prototypes generally run at speeds much closer to the clock speed at which the manufactured chip will run than other types of functional verification, e.g., software simulation, thereby allowing for verifying the circuit design under many more conditions in the same amount of time than other verification methods, and in particular, software simulation. The circuit design prototype may also be operated in another electronic circuit, e.g., the electronic circuit for which the design under verification will be used after fabrication, so that the circuit design prototype may be observed and tested in an environment in which the manufactured chip will be used. As such, circuit designers may use FPGA prototyping as a vehicle for software co-development and validation, increasing the speed and accuracy of system developments.

Prototyping of a circuit design using programmable logic chips (e.g., FPGAs) can have advantages over other types of functional verification, namely emulation using a plurality of emulation processors. First, prototyping using programmable logic chips generally results in higher speed relative to emulation using emulation processors. Second, such higher-speed circuit design prototypes using programmable logic chips can sometimes even run in real-time, that is, the prototype may run at the intended clock speed of the manufactured chip, rather than a reduced clock speed. This is not always the case, notably for higher performance circuit designs that have clock speeds higher than the maximum allowed by the programmable logic chips. Third, such prototyping systems using programmable logic chips are generally of lower cost than an emulation system using processors.

Recently, RTL designs used for prototyping have become very large and generally need to be mapped/partitioned to several large FPGAs on a prototyping system. Typically, these large designs employ many clocks (e.g., one to one hundred or more clocks) for the operation of the design. With multiple FPGAs, interconnects are required between the FPGAs for signal flow from one portion of the circuit design logic on a first FPGA to another portion of the circuit design logic on a second FPGA and so forth. However, current FPGA designs have a limited number of interconnects, which results in overall limited bandwidth for multiple FPGA prototyping systems. In conventional designs, when design clocks are distributed over the interconnects, the system bandwidth is severely reduced for distributing other signals, leading to overall system performance degradation. One additional issue is that distributing clock signals on interconnects results in misalignment of clock edges in the different FPGAs of the system, leading to distortion in waveform capture.

Current FPGA-based prototyping systems deal with some of the problems of a limited number of FPGA I/O pins. For example, FIG. 1 illustrates a conventional prototyping design 100 having multiple FPGAs in which the clock signals are transmitted from a first FPGA 110 to a second FPGA 120. As shown, reference clock/control signals 102 can be generated by a central clock generator that is on the prototyping board, but that is not part of any FPGA hosting a circuit design partition. These signals 102 are transmitted to a clock generator 112 on first FPGA 110, which uses the reference clock as an input to further generate a set of user clocks of different frequencies required by the prototyping design. The user clocks are then provided to the logic partial design 114 on the FPGA 110 and to the logical partial design 124 of the second FPGA 120. It should be appreciated that the logic partial design of each FPGA corresponds to the actual logic of the RTL design.

Although FIG. 1 is a simplistic design of an existing FPGA prototyping system, it should be appreciated than one thousand or more signals can be transmitted between FPGA 110 and FPGA 120. One partial solution for dealing with the system's limited bandwidth is to multiplex signal pins, so that more than one signal may be carried on a single interconnect between I/O pins, freeing up I/O pins for clock signals. However, this technique is still inadequate as the number of FPGA and ASIC logic gates continue to grow in size faster than the number of available I/O pins. Moreover, the delays incurred on the clocks themselves will cause clock misalignment among the chips, requiring the gates they feed to slow down in order to compensate for the delays. This problem is amplified when more FPGAs are included in the prototyping system, as each destination FPGA will likely have a different delay value.

SUMMARY

Accordingly, an apparatus and method is disclosed for fast phase aligned local generation of design clocks on a multiple FPGA system via clock generator replication.

In one embodiment, the apparatus includes a reference clock that generates a clock signal have a reference frequency; a plurality of programmable logic devices, where each of the plurality of programmable logic devices includes an aligned edge clock generator that receives the reference clock and generates a local reference clock signal that drives at least one local design clock signal based on the local reference clock signal, wherein respective edges of each the local design clock signals generated by the clock generaor of each programmable logic device are aligned.

According to one embodiment, each of the plurality of programmable logic devices is a field-programmable gate array having logic programmable as a partial logic design for the prototyping system.

According to one embodiment, each of the plurality of programmable logic devices further comprises phase locked loop circuitry that receives the clock signal from the reference clock and generates the local reference clock signal for the aligned edge clock generator.

According to one embodiment, the aligned edge clock generator of each programmable logic device transmits the at least one local design clock signal to the partial logic design on the respective field-programmable gate array.

According to one embodiment, the at least one local design clock signal drives the partial logic design during an operation cycle of the prototyping system.

According to one embodiment, the aligned edge clock generator of each programmable logic device drives a plurality of local design clock signals and the edges of each of the plurality of local design clock signals are aligned with one another on each programmable logic device.

According to another embodiment, a computer-implemented method is provided for generating synchronized clock generators on each FPGA in a prototyping system. The method includes partitioning a circuit design into a plurality of partitions, wherein each of the plurality of partitions can be programmed on one of a plurality of programmable logic devices, with at least some of the plurality of programmable logic devices disposed on a prototyping board; programming a reference clock on the prototyping board to generate a reference clock signal have a reference frequency; programming an aligned edge clock generator on each of the plurality of programmable logic devices to receive the reference clock signal; and programming the aligned edge clock generator on each of the plurality of programmable logic devices to generate a local reference clock signal that drives at least one local design clock signal based on the local reference clock signal, where respective edges of each the local design clock signals generated by the aligned edge clock generator of each programmable logic device are aligned.

According to one embodiment, each of the plurality of programmable logic devices is a field-programmable gate array and user logic on each of the field-programmable gate arrays is programmed as a partial logic design for the prototyping system.

According to one embodiment, the method hod further includes programming each of the plurality of programmable logic devices to include phase locked loop circuitry that receives the clock signal from the reference clock and generates the local reference clock signal for the aligned edge clock generator.

According to one embodiment, the method further includes programming the aligned edge clock generator of each programmable logic device to transmit the at least one local design clock signal to the partial logic design on the respective field-programmable gate array.

According to one embodiment, the method further includes programming the at least one local design clock signal to drive the partial logic design during an operation cycle of the prototyping system.

According to one embodiment, the method further includes programming the aligned edge clock generator of each programmable logic device to drive a plurality of local design clock signals with the edges of each of the plurality of local design clock signals being aligned with one another on each programmable logic device.

According to one embodiment, the method further includes disconnecting existing loads to original local design clocks in each of the plurality of programmable logic devices before programming the phase locked loop circuitry in each of the plurality of programmable logic devices to receive the clock signal from the reference clock; and connecting the original local design clocks to the aligned edge clock generators, respectively.

According to another embodiment, a computer-readable non-transitory storage medium is provided having stored thereon a plurality of instructions, the plurality of instructions when executed by a computer, cause the computer to partition a circuit design into a plurality of partitions, wherein each of the plurality of partitions can be programmed on one of a plurality of programmable logic devices, with at least some of the plurality of programmable logic devices disposed on a prototyping board; program a reference clock on the prototyping board to generate a reference clock signal have a reference frequency; program an aligned edge clock generator on each of the plurality of programmable logic devices to receive the reference clock signal; and program the aligned edge clock generator on each of the plurality of programmable logic devices to generate a local reference clock signal that drives at least one local design clock signal based on the local reference clock signal, where respective edges of each the local design clock signals generated by the aligned edge clock generator of each programmable logic device are aligned.

According to one embodiment, each of the plurality of programmable logic devices is a field-programmable, gate array and user logic on each of the field-programmable gate arrays is programmed as a partial logic design for the prototyping system.

According to one embodiment, the method further includes the plurality of instructions when executed by a computer, further cause the computer to program each of the plurality of programmable logic devices to include phase locked loop circuitry that receives the clock signal from the reference clock and generates the local reference clock signal for the aligned edge clock generator.

According to one embodiment, the method further includes the plurality of instructions when executed by a computer, further cause the computer to program the aligned edge clock generator of each programmable logic device to transmit the at least one local design clock signal to the partial logic design on the respective field-programmable gate array.

According to one embodiment, the method further includes the plurality of instructions when executed by a computer, further cause the computer to program the at least one local design clock signal to drive the partial logic design during an operation cycle of the prototyping system According to one embodiment, the method further includes the plurality of instructions when executed by a computer, further, cause the computer to program the aligned edge clock generator of each programmable logic device to drive a plurality of local design clock signals with the edges of each of the plurality of local design clock signals being aligned with one another on each programmable logic device.

According to one embodiment, the method further includes the plurality of instructions when executed by a computer, further cause the computer to disconnect existing loads to original local design clocks in each of the plurality of programmable logic devices before programming the phase locked loop circuitry in each of the plurality of programmable logic devices to receive the clock signal from the reference clock; and connect the original local design clocks to the aligned edge clock generators, respectively.

The above and other preferred features described herein, including various novel details of implementation and combination of elements, will now be more particularly described with reference to the accompanying drawings and pointed out in the claims. It will be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

FIG. 3 illustrates a flow diagram of a method for fast phase aligned local generation of design clocks on a multiple FPGA system according to an exemplary embodiment.

Figure 1:
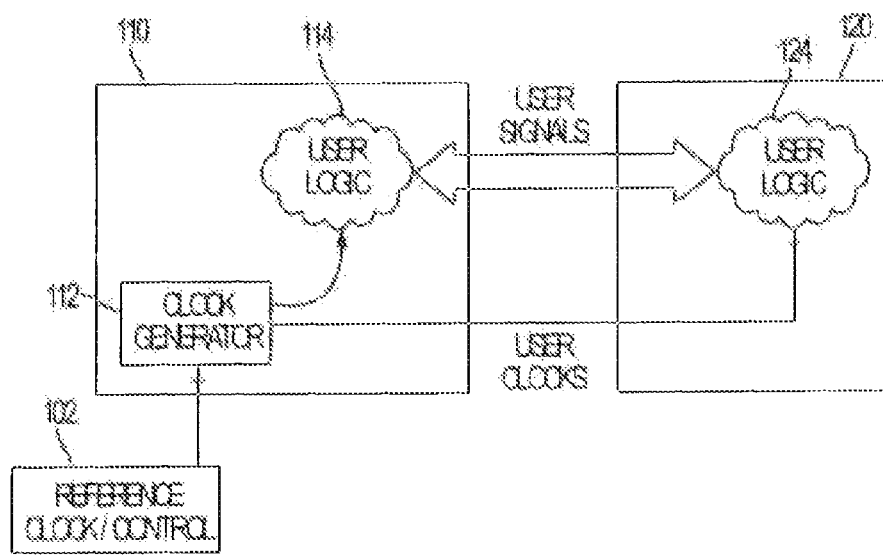
FIG. 1 illustrates a conventional prototyping design having multiple FPGAs in the clock signals are transmitted from a first FPGA to a second FPGA.

The figures are not necessarily drawn to scale and the elements of similar structures or functions are generally represented by like reference numerals for illustrative purposes throughout the figures. The figures are only intended to facilitate the description of the various embodiments described herein; the figures do not describe every aspect of the teachings disclosed herein and do not limit the scope of the claims.

DETAILED DESCRIPTION

Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the present invention. However, it will be apparent to one skilled in the art that these specific details are not required to practice the present invention.

Some portions of the detailed descriptions that follow are presented in terms of algorithms and symbolic representations of operations on data hits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present patent document also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, including floppy disks, optical disks. CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matte. It is also expressly noted that the dimensions and the shapes of the components shown in the figures are designed to help to understand how the present teachings are practiced, but not intended to limit the dimensions and the shapes shown in the examples.

Figure 2A:
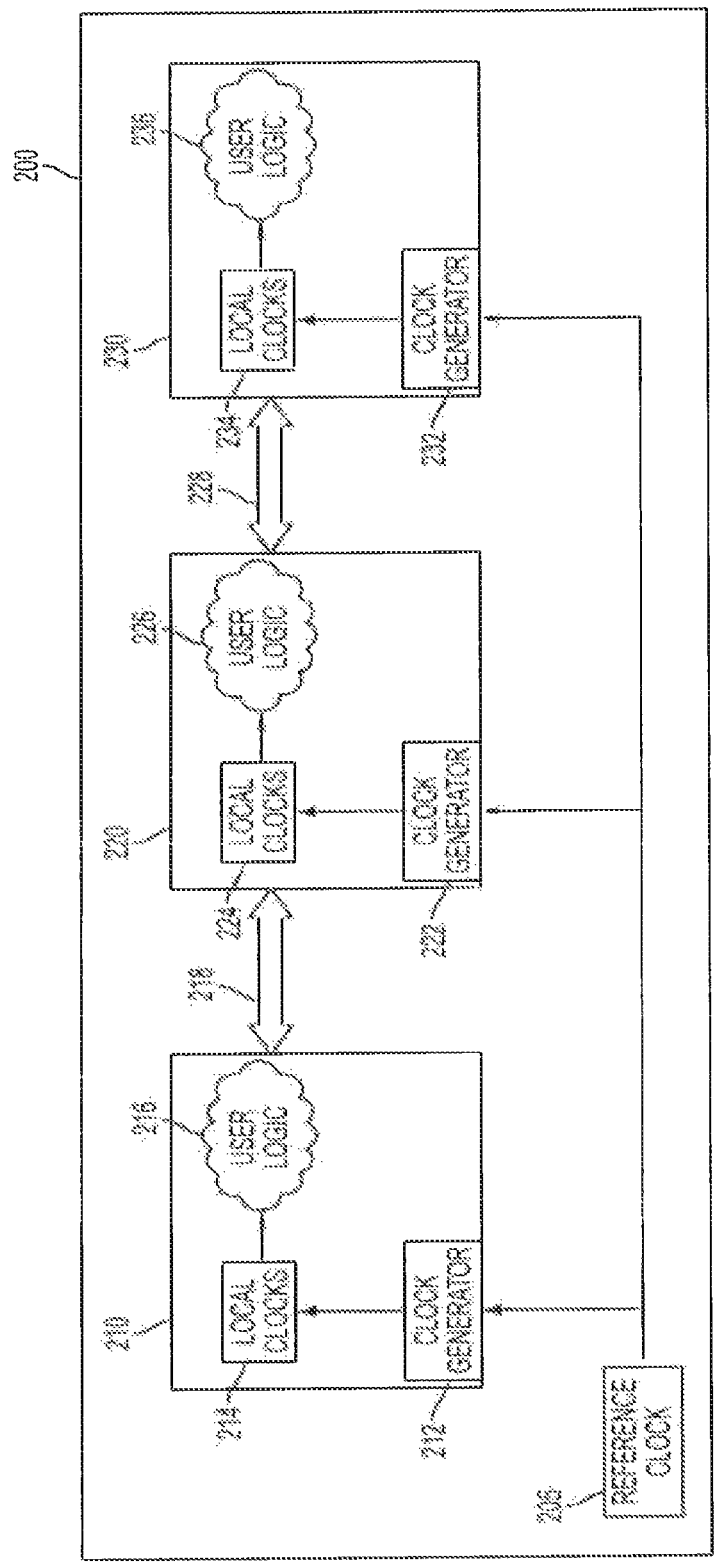
FIG. 2A illustrates an exemplary circuit design including a prototyping board partitioned into three blocks of circuitry, each including a phased aligned design clock according to an exemplary embodiment.

FIG. 2A illustrates an exemplary circuit design including a prototyping board 200 partitioned into three blocks of circuitry, each including a phased aligned design clock according to an exemplary embodiment. As shown, each block is programmed into one FPGA, shown as FPGAs 210, 220 and 230, that are part of an exemplary prototyping system comprising a circuit board 200 that hosts the FPGAs, clock generation circuits, interconnect lines connecting the FPGAs to each other. I/O devices for communication to external hardware, connectors, and memory. It should be appreciated that the programmable logic devices used in this embodiment are FPGAs. However, as will be appreciated by one of skill in the art, any number of programmable logic devices suitable for prototyping may be used in place of the FPGAs of the exemplary embodiment.

Partitioning of circuit design may be accomplished by using any number of partitioning techniques well-known to those in the field of prototyping. As shown, the prototyping board 200 includes a single on-board reference clock 205 that feeds a reference clock signal to each of the FPGAs 210, 220 and 230. In the exemplary embodiment, the reference clock 205 is a programmable reference clock, such that the frequency of reference clock signal can be chosen by the system designer or the like under program control.

Furthermore, each FPGA 210, 220 and 230 is programmed to have an aligned edge clock generator 212, 222 and 232. Each of the aligned edge clock generators 212, 222 and 232 in the exemplary embodiment is driven by the reference clock signal generated by reference clock 205. Furthermore, the aligned edge clock generators 212, 222 and 232 are each provided to drive a plurality of local design clocks 214, 224 and 234, respectively, which generate internal clock inputs for the user logic of each FPGA 210, 220, and 230. Using aligned edge clock generators, an operation cycle can be scheduled for each edge of the fastest clock in the local clocks 214, 224 and 234, respectively. All other local clocks used to drive the partial logic design of each FPGA can be scheduled relative to the fastest clock, with the slower clock edges "aligned" to the next operation cycle. For example, if the user logic 216, 226, and 236 requires two clocks, one at 100 MHz (i.e., the fastest clock) and one at 50 MHz (i.e., a slower clock), each clock generator 212, 222 and 232 individually ensures that both rising and falling edges of the 50 MHz clock are aligned at the rising edge of the fastest clock. Moreover, the low-skew lines on the prototyping board on each of the FPGAs further ensure that the edges of the slower clocks (e.g., the example 50 MHz clock) on each FPGA are aligned with each other. In other words, the rising edge of the slower clock on FPGA 210 is aligned with the rising edge of the slower clock on the other FPGAs 220 and 230.

Figure 2B:
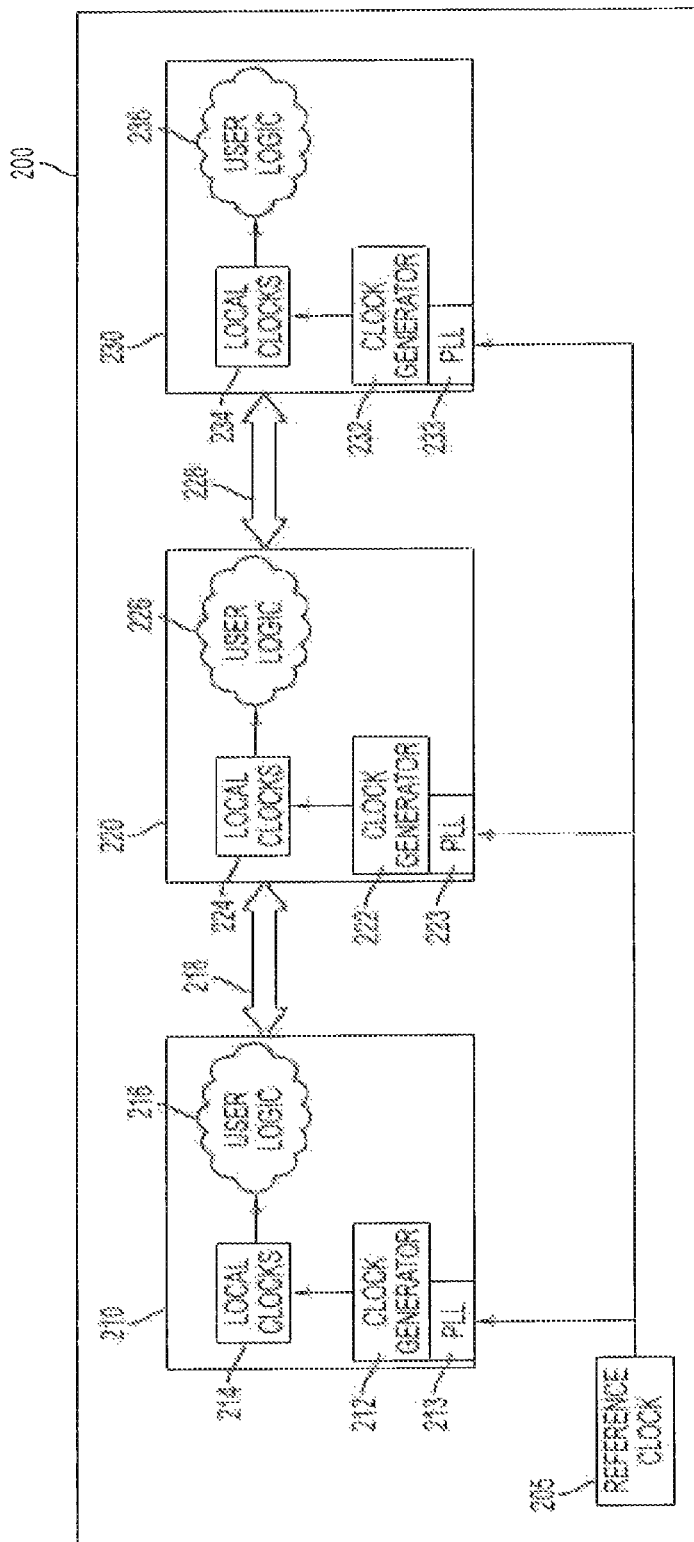
FIG. 2B illustrates an alternative exemplary circuit design including a prototyping board partitioned into three blocks of circuitry, each including a phased aligned design clock according to an exemplary embodiment.

FIG. 2B illustrates an alternative exemplary circuit design including a prototyping board partitioned into three blocks of circuitry, each including a phased aligned design clock according to an exemplary embodiment. In this embodiment, each FPGA may have built-in phase-locked loops ("PLL"), which are shown as PLLs 213, 223 and 233. The reference clock signal from the reference clock 205 is fed to PLLs 213, 223 and 233, which each generate and output a signal whose phase is related to the phase of the reference clock input signal. Preferably the reference clock signal is transmitted to each of FPGAs 210, 220 and 230 on low-skew lines to ensure edge alignment of each design clock signal generated by each individual FPGA 210, 220 and 230.

As further shown in FIG. 2B, each of the output signals of PLLs 213, 223 and 233 is fed to an aligned edge clock generator 212, 222 and 232 on each of FPGAs 210, 220 and 230, respectively. The PLLs can include a variable frequency oscillator that generates a periodic signal and a phase detector. The phase detector compares the phase of the periodic signal with the phase of the reference clock input signal and adjusts the oscillator to keep the phases matched. In this manner, the output signals of each PLL 213, 223 and 233 will be phase aligned with one other. Moreover, although not shown, in one embodiment the output signal from each PLL can be compared with the input signal as part of a feedback loop to ensure the input and output frequencies are the same. In addition, the PLLs can output a signal having the same frequency as the input frequency or a frequency that is a multiple of the input frequency as would be understood to one of skill in the art.

In addition, for both embodiments shown in FIGS. 2A and 2B, start/stop and reset control signals can be concurrently transmitted to each FPGA 210, 220, and 230 using low-skew lines on the board. These signals are transmitted to each aligned edge clock generator 212, 222 and 232 to either start, stop or initiate a reset of the clock generators to synchronize all clock operations across each of the FPGAs 210, 220, and 230 on the prototyping board 200. More particular, these signals synchronize the transmission of clock signals from the aligned edge clock generators 212, 222 and 232 such that all clock signals provided to the respective user logic 216, 226, and 236 are aligned with each other across the FPGAs 210, 220, and 230.

By duplicating the system clock generator with individual clock generators on each FPGA of the partitioned system, the exemplary circuit designs shown in FIGS. 2A and 2B achieves synchronized and aligned clock signals for all FPGAs without requiring clock signals to be transmitted between the FPGAs using the limited number of I/O signal interconnects, effectively freeing system bandwidth for other communication signals. Accordingly, interconnects 218 (between FPGAs 210 and 220) and interconnects 228 (between FPGAs 220 and 230) can be used primarily for operational signals relating to the user logic of the circuit design, which, as a result, enables the circuit design to run at speeds much closer to the clock speed at which the manufactured chip will run than conventional designs.

FIG. 3 illustrates a flow diagram of a method 300 for fast phase aligned local generation of design clocks on a multiple FPGA system according to an exemplary embodiment. Initially, at step 305, a designer generates a circuit design for prototyping into an output file. A wide variety of electronic design automation ("EDA") tools can be used to generate and compile the circuit design.

Next, the designer issues a compile command at step 310 to compile the user's device design including the aligned edge clock generators on each FPGA. The exemplary process for compiling the device design disclosed herein will be described in detail below with respect to FIG. 4. However, according to the exemplary embodiment, it should generally be understood that step 410 includes generating a circuit design that is divided into multiple partitions with each partition programmed into a distinct FPGA of the prototyping board. As described above, each FPGA is programmed to include an aligned edge clock generator (e.g., clock generators 212, 222 and 232 in the examples shown in FIGS. 1 and 2) driven by a reference clock programmed on the prototyping board. In one embodiment, the FPGAs each include a PLL (shown as PLLs 213, 223 and 233 in the example shown in FIG. 2) that drives the reference clock input to the programmable aligned edge clock generators.

Once the circuit is designed and compiled, the circuit designer begins execution of the system in which the circuit design prototype is operating to begin the design evaluation and debugging process (step 315). During operation a reference clock programmed on the prototyping board (e.g., reference clock 205 of FIG. 2) transmits a reference clock signal to each FPGA over low-skew lines on the prototyping board (step 320). At step 325, each aligned edge clock generators on each FPGA receives the reference clock signal and outputs a local reference clock signal (i.e., local to that FPGA) whose phase is related to the phase of the reference clock input signal. As noted above, in one embodiment, PLLs can be used to drive the reference clock for the programmable aligned edge clock generators.

Once the reference clock is received, each aligned edge clock generator (e.g., clock generators 212, 222 and 232) drives local design clocks (e.g., local clocks 214, 224 and 234 shown in FIG. 2) that are output to the partial logic design of the respective FPGA (step 330). As described above, the output signals from each clock generator and across each FPGA are aligned since they are all driven by the same reference clock signal that is transmitted over low skew lines of the prototyping board. Finally, at step 335, operation of the partial logic designs on each FPGA are performed according to the respective and aligned clock signals output from the clock generators and waveform capture can be performed for debugging according known techniques in the art.

Figure 4:
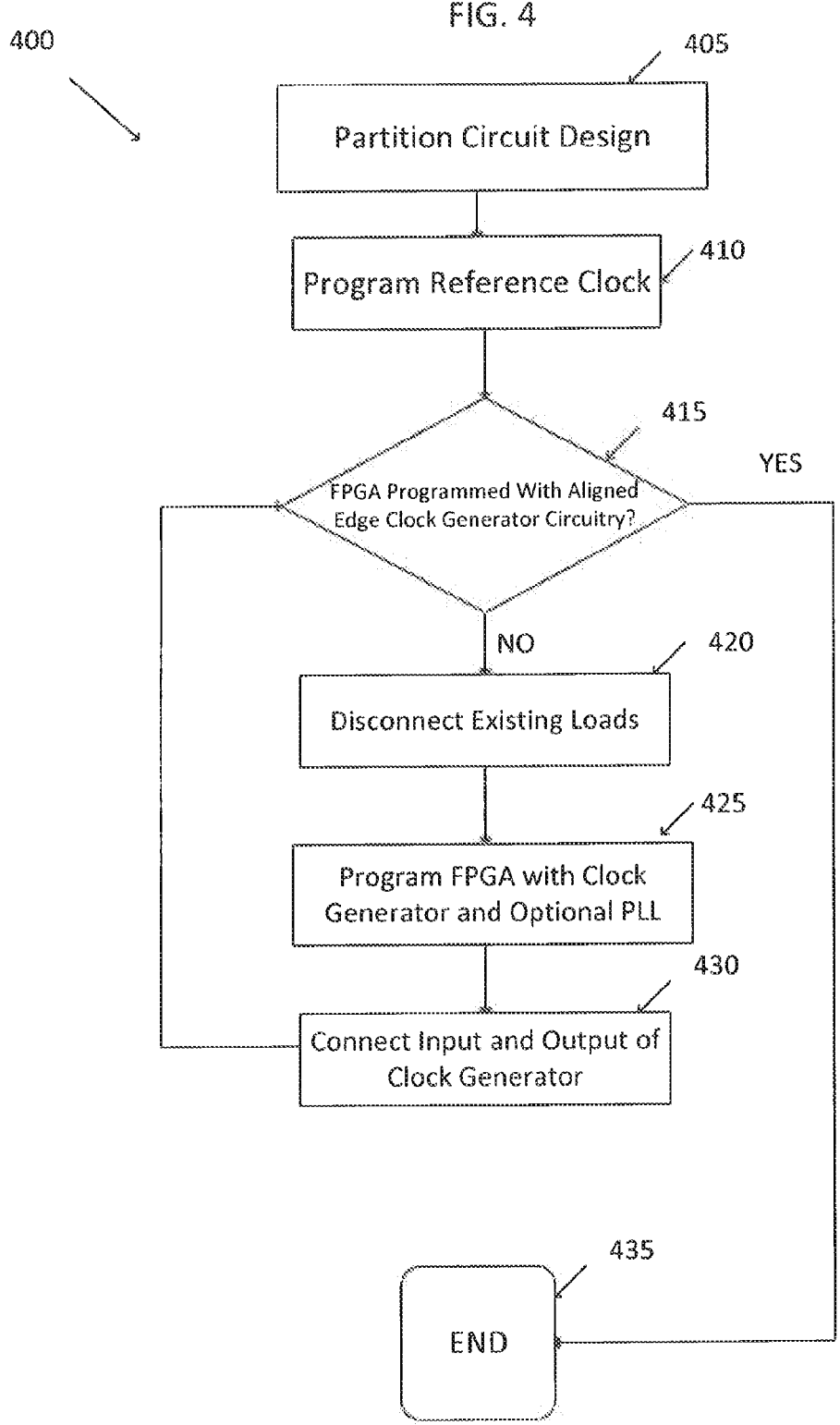
FIG. 4 illustrates a software flow chart for a method for creating circuitry to be programmed into FPGAs for prototyping according to an exemplary embodiment.

FIG. 4 illustrates a software flow chart for a method 400 for creating circuitry to be programmed into FPGAs for prototyping according to an exemplary embodiment. As described above, the method shown in FIG. 4 corresponds to an exemplary embodiment of step 310 of FIG. 3. Moreover, the prototyping software is run on a workstation, comprising a general purpose processor, RAM, hard-disk or other permanent storage, and input/output devices in electrical communication with a prototyping board comprising FPGAs or other programmable logic chips, input/output circuitry, and interconnect circuitry connecting the programmable logic chips to each other and to the input-output circuitry. In addition, the design file for the circuit design can be in any format suitable for partitioning and programming into programmable logic chips of a prototyping system, for example hardware description language ("HDL") format.

Initially, at step 405, the circuit design is partitioned into two or more partitions, each partition to be programmed into a distinct FPGA of the prototyping hoard. As previously discussed, partitioning may be accomplished using any number of techniques well known in the field of prototyping that divide up the logic of the circuit design for programming into a plurality of FPGAs. Next a reference clock (e.g., reference clock 205 of FIG. 2) is programmed on the prototyping board to generate a reference clock signal with a frequency chosen by the system designer.

The software then cycles through a loop containing steps 415-430 that generates the logic for the clock generator replication for each FPGA hosting a partition. In particular, at decision 415, if each FPGA to be programmed with a partition has been programmed to include an aligned edge clock generator, then the software proceeds to step 435, which is the end of the design process. If not every FPGA to be programmed with a partition has already been programmed with the circuitry, which should be the case the first time decision 415 is encountered by the software, the software proceeds to program the circuitry needed for clock generator replication into a first FPGA of the circuit design at step 420. In particular, step 420 involves disconnecting any load to the original clock design. For example, as shown in FIG. 1 discussed above, one FPGA in the chain (e.g., FPGA 120 of FIG. 1) may be connected to an upstream FPGA (e.g., FPGA 110 of FIG. 1) by interconnects to receive clock signals from a clock generator local to the upstream FPGA. At step 420, all such connections to receive clock signals are disconnected. It should be appreciated that this step is bypassed if no such connections exist.

Next, at step 425, the first FPGA is programmed to include aligned edge clock generator and, optionally a PLL, as described above. Then, at step 430, the input of the aligned edge clock generator or the PLL is connected to the to a reference clock (e.g., reference clock 205 of FIGS. 2A and 2B) and the output of the aligned edge clock generator is connected to the local design clocks (e.g., local design clocks 214, 224 and 234 shown in FIGS. 2A and 2B) on that FPGA.

After step 430 is performed for the first FPGA of the circuit design, the method returns to step 415 to query whether every other FPGA has been programmed to include the circuitry for the local aligned edge clock generator. If the answer is "NO", steps 420 through 430 are performed for the next FPGA in the circuit design. In the exemplary embodiment, this loop is repeated until each partitioned FPGA in the circuit design has been programmed to the circuitry for the replicated local clock generator according to the exemplary embodiment. It should be appreciated that in an alternative embodiment, only some, but not all, of the FPGAs in the circuit design are programmed to include the circuitry of the exemplary embodiment. Once each desired FPGA of the circuit design is programmed according to steps 420 through 430, step 415 will be answered YES and the method proceeds to step 435, which is the end of the circuit design programming. At this point, the design file is compiled for execution as discussed above with respect to FIG. 3.

Accordingly, it should be appreciated that the above description and drawings are only to be considered illustrative of specific embodiments, which achieve the features and advantages described herein. Modifications and substitutions to specific process conditions can be made. Accordingly, the embodiments in this patent document are not considered as being limited by the foregoing description and drawings.

What is claimed is:

1. A prototyping apparatus comprising:
a reference clock that generates a clock signal have a reference frequency;
a plurality of programmable logic devices, where each of the plurality of programmable logic devices includes an aligned edge clock generator programmed therein that receives the reference clock and generates an internally generated local reference clock signal, each of the programmable logic devices having a partial user logic design programmed therein, the internally generated local reference clock signal drives a plurality of internally generated local design clock signals that are formed based on the internally generated local reference clock signal, the plurality of internally generated local design clock signals for each of the plurality of programmable logic devices being input to the partial user logic design programmed on respective ones of the plurality of programmable logic devices,
wherein respective edges of each the internally generated local design clock signals generated by the clock generator of each programmable logic device are aligned, and wherein an operation cycle of the user design logic programmed into respective ones of the plurality of logic devices is scheduled for each edge of a fastest one of the plurality of internally generated local design clock signals, and the plurality of internally generated local design clock signals in each of the plurality of programmable logic devices that are slower than the fastest one of the plurality of internally generated local design clock signals are scheduled relative to the fastest one of the plurality of internally generated local design clock signals.

2. The apparatus of claim 1, wherein each of the plurality of programmable logic devices further comprises phase locked loop circuitry that receives the clock signal from the reference clock and generates a phase aligned clock signal for the aligned edge clock generator, wherein the phase aligned clock signal are matched on each of the plurality of programmable logic devices.

3. The apparatus of claim 1, wherein the aligned edge clock generator of each programmable logic device drives a plurality of internally generated local design clock signals and the edges of each of the plurality of internally generated local design clock signals are aligned with one another on each programmable logic device.

4. A computer-implemented method for generating synchronized clock generators on each FPGA in a prototyping system, the method comprising:
 partitioning a circuit design into a plurality of circuit design partitions, wherein each of the plurality of circuit design partitions can be programmed on one of a plurality of programmable logic devices, with at least some of the plurality of programmable logic devices disposed on a prototyping board;
 programming a reference clock on the prototyping board to generate a reference clock signal have a reference frequency;
 programming an aligned edge clock generator into each of the plurality of programmable logic devices to receive the reference clock signal;
 programming the aligned edge clock generator on each of the plurality of programmable logic devices to generate an internally generated local reference clock signal that drives a plurality of internally generated local design clock signals that are formed based on the internally generated local reference clock signal, where respective edges of each the internally generated local design clock signals generated by the aligned edge clock generator of each programmable logic device are aligned;
 programming the aligned edge clock generator of each programmable logic device to transmit the plurality of internally generated local design clock signal to the plurality of circuit design partitions; and
 programming the plurality of programmable logic devices so that each operation cycle of each of the plurality of circuit design partitions is scheduled for each edge of a fastest one of the plurality of internally generated local design clock signals, and the plurality of internally generated local design clock signals in each of the plurality of programmable logic devices that are slower than the fastest one of the plurality of internally generated local design clock signals are scheduled relative to the fastest one of the plurality of internally generated local design clock signals.

5. The computer-implemented method according to claim 4, wherein each of the plurality of programmable logic devices is a field-programmable gate array and each of the plurality of circuit design partitions on respective ones of the field-programmable gate arrays is programmed as a partial logic design for the prototyping system.

6. The computer-implemented method according to claim 5, further comprising programming each of the plurality of programmable logic devices to include phase locked loop circuitry that receives the clock signal from the reference clock and generates a phase aligned clock signal for the aligned edge clock generator, wherein the phase aligned clock signal are matched on each of the plurality of programmable logic devices.

7. The computer-implemented method according to claim 4, further comprising programming the aligned edge clock generator of each programmable logic device to drive a plurality of internally generated local design clock signals with the edges of each of the plurality of internally generated local design clock signals being aligned with one another on each programmable logic device.

8. The computer-implemented method according to claim 6, further comprising
 disconnecting existing loads to original local design clocks in each of the plurality of programmable logic devices before programming the phase locked loop circuitry in each of the plurality of programmable logic devices to receive the clock signal from the reference clock; and
 connecting the original local design clocks to the aligned edge clock generators, respectively.

9. A computer-readable non-transitory storage medium having stored thereon a plurality of instructions, the plurality of instructions when executed by a computer, cause the computer to:
 partition a circuit design into a plurality of circuit design partitions, wherein each of the plurality of circuit design partitions can be programmed on one of a plurality of programmable logic devices, with at least some of the plurality of programmable logic devices disposed on a prototyping board;
 program a reference clock on the prototyping board to generate a reference clock signal have a reference frequency;
 program an aligned edge clock generator into each of the plurality of programmable logic devices to receive the reference clock signal;
 program the aligned edge clock generator on each of the plurality of programmable logic devices to generate an internally generated local reference clock signal that drives a plurality of internally generated local design clock signals that are formed based on the internally generated local reference clock signal, where respective edges of each the internally generated local design clock signals generated by the aligned edge clock generator of each programmable logic device are aligned
 program the aligned edge clock generator of each programmable logic device to transmit the plurality of internally generated local design clock signal to the plurality of circuit design partitions; and
 program the plurality of programmable logic devices so that each operation cycle of each of the plurality of circuit design partitions is scheduled for each edge of a fastest one of the plurality of internally generated local design clock signals, and the plurality of internally generated local design clock signals in each of the plurality of programmable logic devices that are slower than the fastest one of the plurality of internally generated local design clock signals are scheduled relative to the fastest one of the plurality of internally generated local design clock signals.

10. The computer-readable non-transitory storage medium according to claim 9, wherein each of the plurality of programmable logic devices is a field-programmable gate array and each of the plurality of circuit design partitions on respective ones of the field-programmable gate arrays is programmed as a partial logic design for the prototyping system.

11. The computer-readable non-transitory storage medium according to claim 9, wherein the plurality of instructions when executed by a computer further cause the computer to program each of the plurality of programmable logic devices to include phase locked loop circuitry that receives the clock signal from the reference clock and generates a phase aligned clock signal for the aligned edge clock generator, wherein the phase aligned clock signal are matched on each of the plurality of programmable logic devices.

12. The computer-readable non-transitory storage medium according to claim 9, wherein the plurality of instructions when executed by a computer further cause the computer to program the aligned edge clock generator of each programmable logic device to drive a plurality of internally generated local design clock signals with the edges of each of the plurality of internally generated local design clock signals being aligned with one another on each programmable logic device.

13. The computer-readable non-transitory storage medium according to claim 9, wherein the plurality of instructions when executed by a computer further cause the computer to:
  disconnect existing loads to original local design clocks in each of the plurality of programmable logic devices before programming the phase locked loop circuitry in each of the plurality of programmable logic devices to receive the clock signal from the reference clock; and
connect the original local design clocks to the aligned edge clock generators, respectively.

* * * * *